(12) United States Patent
Chikamatsu et al.

(10) Patent No.: US 12,552,399 B2
(45) Date of Patent: Feb. 17, 2026

(54) VEHICLE-MOUNTED CONTROL APPARATUS

(71) Applicant: Mitsubishi Electric Corporation, Tokyo (JP)

(72) Inventors: Kojiro Chikamatsu, Tokyo (JP); Hiroshi Okuyama, Tokyo (JP); Toshinori Matsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 18/695,425

(22) PCT Filed: Nov. 10, 2021

(86) PCT No.: PCT/JP2021/041268
§ 371 (c)(1),
(2) Date: Mar. 26, 2024

(87) PCT Pub. No.: WO2023/084624
PCT Pub. Date: May 19, 2023

(65) Prior Publication Data
US 2024/0391474 A1 Nov. 28, 2024

(51) Int. Cl.
*B60W 50/02* (2012.01)
*H04L 67/12* (2022.01)
*H04W 4/40* (2018.01)

(52) U.S. Cl.
CPC ......... *B60W 50/0205* (2013.01); *H04L 67/12* (2013.01); *H04W 4/40* (2018.02); *B60W 2050/021* (2013.01)

(58) Field of Classification Search
CPC ........ B60W 50/0205; B60W 2050/021; H04L 67/12; H04L 12/28; H04L 43/00; H04W 4/40; B60R 25/00; G06F 21/55
(Continued)

(56) References Cited

U.S. PATENT DOCUMENTS 11,218,853 B2 * 1/2022 Harada ................ H04W 48/14
2001/0034577 A1 * 10/2001 Grounds ............... H04W 4/029
340/988

(Continued)

FOREIGN PATENT DOCUMENTS

JP 6531011 B2 6/2019
JP 2021064877 * 4/2021

(Continued)

OTHER PUBLICATIONS

International Search Report and Written Opinion mailed on Jan. 25, 2022, received for PCT Application PCT/JP2021/041268, filed on Nov. 10, 2021, 9 pages including English Translation.

*Primary Examiner* — Muhammad Shafi
(74) *Attorney, Agent, or Firm* — XSENSUS LLP

(57) ABSTRACT

A vehicle-mounted control apparatus includes a first storage unit that stores a rule at a time when communication data is normal, a second storage unit that stores part of rules stored in the first storage unit, a monitoring unit that monitors whether or not communication data is normal, a reference-rule recording unit that records a rule that coincides with under-monitoring communication data and the number of coincidences therebetween, and a rule-updation unit that updates a rule stored in the second storage unit, based on a rule stored in the first storage unit and a record in the reference-rule recording unit.

8 Claims, 11 Drawing Sheets

(58) Field of Classification Search
USPC .......................................................... 701/32.7
See application file for complete search history.

(56) References Cited

U.S. PATENT DOCUMENTS

2020/0262443 A1* 8/2020 Takinai ............... B60W 50/045
2021/0111922 A1* 4/2021 Sano ....................... H04L 69/22

FOREIGN PATENT DOCUMENTS

| WO | WO-2015075799 | * | 5/2015 |
| WO | WO-2021205655 | * | 10/2021 |

* cited by examiner

FIG.2

RULES IN FIRST STORAGE UNIT

| RULE NUMBER | DATA ID | TRANSMISSION SOURCE | TRANSMISSION DESTINATION | DATA SIZE | DATA |
|---|---|---|---|---|---|
| 1 | 0x01 | VEHICLE-MOUNTED CONTROL APPARATUS A | VEHICLE-MOUNTED CONTROL APPARATUS B | 8 | $x < 4$ |
| 2 | 0x02 | VEHICLE-MOUNTED CONTROL APPARATUS A | VEHICLE-MOUNTED CONTROL APPARATUS C | 16 | $10 < x$ |
| 3 | 0x01 | VEHICLE-MOUNTED CONTROL APPARATUS B | VEHICLE-MOUNTED CONTROL APPARATUS A | 16 | $1 < x < 4$ |
| 4 | 0x03 | VEHICLE-MOUNTED CONTROL APPARATUS B | VEHICLE-MOUNTED CONTROL APPARATUS C | 8 | $x < 8$ |
| 5 | 0x03 | VEHICLE-MOUNTED CONTROL APPARATUS C | VEHICLE-MOUNTED CONTROL APPARATUS B | 16 | $x = 255$ |

FIG.3

RULES IN SECOND STORAGE UNIT

| RULE NUMBER | DATA ID | TRANSMISSION SOURCE | TRANSMISSION DESTINATION | DATA SIZE | DATA |
|---|---|---|---|---|---|
| 1 | 0x03 | VEHICLE-MOUNTED CONTROL APPARATUS B | VEHICLE-MOUNTED CONTROL APPARATUS C | 8 | $X < 8$ |
| 2 | 0x01 | VEHICLE-MOUNTED CONTROL APPARATUS A | VEHICLE-MOUNTED CONTROL APPARATUS B | 8 | $X < 4$ |
| 3 | 0x03 | VEHICLE-MOUNTED CONTROL APPARATUS C | VEHICLE-MOUNTED CONTROL APPARATUS B | 16 | $x = 255$ |

FIG.4

REFERENCE-RULE RECORDS

| RULE NUMBER | NUMBER OF COINCIDENCES |
|---|---|
| 1 | 5 |
| 2 | 0 |
| 3 | 0 |
| 4 | 10 |
| 5 | 3 |

FIG.8

RULES IN FIRST STORAGE UNIT

| RULE NUMBER | DATA ID | TRANSMISSION SOURCE | TRANSMISSION DESTINATION | DATA SIZE | DATA | BUS NUMBER | VEHICLE STATE | COMMUNICATION-DATA IMPORTANCE |
|---|---|---|---|---|---|---|---|---|
| 1 | 0x01 | VEHICLE-MOUNTED CONTROL APPARATUS A | VEHICLE-MOUNTED CONTROL APPARATUS B | 8 | $x < 4$ | 1 | NORMAL TRAVELING | 5 |
| 2 | 0x02 | VEHICLE-MOUNTED CONTROL APPARATUS A | VEHICLE-MOUNTED CONTROL APPARATUS C | 16 | $10 < x$ | 1 | NORMAL TRAVELING | 3 |
| 3 | 0x02 | VEHICLE-MOUNTED CONTROL APPARATUS A | VEHICLE-MOUNTED CONTROL APPARATUS C | 16 | $1 < x < 4$ | 1 | NORMAL TRAVELING | 3 |
| 4 | 0x01 | VEHICLE-MOUNTED CONTROL APPARATUS B | VEHICLE-MOUNTED CONTROL APPARATUS A | 8 | $x = 2$ | 1 | NORMAL TRAVELING | 8 |
| 5 | 0x2A | VEHICLE-MOUNTED CONTROL APPARATUS B | VEHICLE-MOUNTED CONTROL APPARATUS C | 16 | $x < 32$ | 1 | AUTONOMOUS DRIVING | 10 |
| 6 | 0x2A | VEHICLE-MOUNTED CONTROL APPARATUS C | VEHICLE-MOUNTED CONTROL APPARATUS B | 16 | $x < 8$ | 1 | AUTONOMOUS DRIVING | 3 |
| 7 | 0xA1 | VEHICLE-MOUNTED CONTROL APPARATUS A | VEHICLE-MOUNTED CONTROL APPARATUS D | 8 | $4 < x$ | 1, 2 | NORMAL TRAVELING | 5 |
| 8 | 0xA2 | VEHICLE-MOUNTED CONTROL APPARATUS B | VEHICLE-MOUNTED CONTROL APPARATUS D | 8 | $4 < x$ | 1, 2 | NORMAL TRAVELING | 10 |
| 9 | 0xA3 | VEHICLE-MOUNTED CONTROL APPARATUS C | VEHICLE-MOUNTED CONTROL APPARATUS D | 8 | $128 < x$ | 1, 2 | AUTONOMOUS DRIVING | 8 |
| 10 | 0xB1 | VEHICLE-MOUNTED CONTROL APPARATUS D | VEHICLE-MOUNTED CONTROL APPARATUS E | 16 | $x = 100$ | 2 | UNDER DIAGNOSIS | 10 |
| 11 | 0xB2 | VEHICLE-MOUNTED CONTROL APPARATUS D | VEHICLE-MOUNTED CONTROL APPARATUS E | 8 | $x < 8$ | 2 | UNDER DIAGNOSIS | 10 |
| 12 | 0xB2 | VEHICLE-MOUNTED CONTROL APPARATUS E | VEHICLE-MOUNTED CONTROL APPARATUS D | 8 | $x = 255$ | 2 | UNDER DIAGNOSIS | 10 |

FIG.9

RULES IN SECOND STORAGE UNIT (DURING NORMAL TRAVELING)

| RULE NUMBER | DATA ID | TRANSMISSION SOURCE | TRANSMISSION DESTINATION | DATA SIZE | DATA | BUS NUMBER | VEHICLE STATE | COMMUNICATION-DATA IMPORTANCE |
|---|---|---|---|---|---|---|---|---|
| 1 | 0xA2 | VEHICLE-MOUNTED CONTROL APPARATUS B | VEHICLE-MOUNTED CONTROL APPARATUS D | 8 | 4 < x | 1, 2 | NORMAL TRAVELING | 10 |
| 2 | 0xA1 | VEHICLE-MOUNTED CONTROL APPARATUS A | VEHICLE-MOUNTED CONTROL APPARATUS D | 8 | 4 < x | 1, 2 | NORMAL TRAVELING | 5 |
| 3 | 0x01 | VEHICLE-MOUNTED CONTROL APPARATUS B | VEHICLE-MOUNTED CONTROL APPARATUS A | 8 | x = 2 | 1 | NORMAL TRAVELING | 8 |
| 4 | 0x01 | VEHICLE-MOUNTED CONTROL APPARATUS A | VEHICLE-MOUNTED CONTROL APPARATUS B | 8 | x < 4 | 1 | NORMAL TRAVELING | 5 |
| 5 | 0x02 | VEHICLE-MOUNTED CONTROL APPARATUS A | VEHICLE-MOUNTED CONTROL APPARATUS C | 16 | 10 < x | 1 | NORMAL TRAVELING | 3 |
| 6 | 0x02 | VEHICLE-MOUNTED CONTROL APPARATUS A | VEHICLE-MOUNTED CONTROL APPARATUS C | 16 | 1 < x < 4 | 1 | NORMAL TRAVELING | 3 |

FIG.10

RULES IN SECOND STORAGE UNIT (UNDER MONITORING)

| RULE NUMBER | DATA ID | TRANSMISSION SOURCE | TRANSMISSION DESTINATION | DATA SIZE | DATA | BUS NUMBER | VEHICLE STATE | COMMUNICATION-DATA IMPORTANCE |
|---|---|---|---|---|---|---|---|---|
| 1 | 0xB1 | VEHICLE-MOUNTED CONTROL APPARATUS D | VEHICLE-MOUNTED CONTROL APPARATUS E | 16 | $x = 100$ | 2 | UNDER DIAGNOSIS | 10 |
| 2 | 0xB2 | VEHICLE-MOUNTED CONTROL APPARATUS D | VEHICLE-MOUNTED CONTROL APPARATUS E | 8 | $x < 8$ | 2 | UNDER DIAGNOSIS | 10 |
| 3 | 0xB2 | VEHICLE-MOUNTED CONTROL APPARATUS E | VEHICLE-MOUNTED CONTROL APPARATUS D | 8 | $x = 255$ | 2 | UNDER DIAGNOSIS | 10 |

FIG.11

RESULTS OF BUS-LOAD MONITORING

| BUS NUMBER | LOAD [ % ] |
|---|---|
| 1 | 20 |
| 2 | 80 |

# VEHICLE-MOUNTED CONTROL APPARATUS

CROSS-REFERENCE TO RELATED APPLICATION

This application is a national stage application, pursuant to 35 U.S.C. § 371, of International Patent Application No. PCT/JP2021/041268, filed Nov. 10, 2021, the entire contents of which are incorporated herein by reference.

TECHNICAL FIELD

The present disclosure relates to a vehicle-mounted control apparatus.

BACKGROUND ART

In general, two or more electronic control devices referred to as ECUs (Electronic Control Units) are mounted in a vehicle; the respective ECUs are connected with a network in which they can communicate with each other through a cable or by radio, so that a vehicle-mounted system is configured.

In recent years, a vehicle-mounted system has been connected with external apparatuses through a network; thus, an evil-minded person may maliciously utilize the network and may intrude the vehicle-mounted system from the outside, through the network. In the case where the vehicle-mounted system is intruded, control programs of the ECU may be tampered with and the control may be hacked; thus, the user of the vehicle may suffer unintended disadvantage.

In a conventional vehicle-mounted system, in order to make it possible that the vehicle travels safely even in the case where part of the control apparatuses fail, there has been considered, for example, an abnormality-coping method in which an abnormality caused by a failure is detected and then functions are degenerated through a fail-safe mechanism.

However, in the case where a cyberattack tampers with the programs of the ECU and hence a scheme for detecting an abnormality caused by a failure is changed or in the case where information, which is a detection object, is rewritten from an abnormal value to a normal value, detection of an abnormality becomes difficult.

Accordingly, as a scheme for detecting an abnormality in a vehicle when the vehicle-mounted control apparatus comes under a cyberattack, there has been studied a scheme for detecting an abnormality by monitoring communication data flowing in a network.

As the scheme for monitoring communication data, there has been studied, for example, a method in which rules at a time when communication data is normal are preliminarily defined, in which it is determined based on the rules whether or not communication data to be transmitted or received is normal, and in which when being in correct, the communication data is detected to be abnormal.

However, there exists a problem that in the case where each time communication data is transmitted or received, it is determined whether or not the communication data is normal, data processing increases when the communication data is massive. Accordingly, it is required that even when the vehicle-mounted control apparatus comes under a cyber-attack, an abnormality is detected without erroneous detection or overlooking, while suppressing the processing load.

Patent Document 1 discloses a control apparatus that can detect an abnormality without increasing the data-processing load, by changing monitoring methods for communication data in accordance with the state of a vehicle.

CITATION LIST

Patent Literature

Patent Document 1: Japanese Patent No. 6531011

SUMMARY OF INVENTION

Technical Problem

However, in the case where an abnormality is detected based on normal-time communication data, it is required to preliminarily define all rules related to communication data corresponding to a normal-time vehicle state and all the rules are comprehensively referred to at a time of monitoring; therefore, the monitoring-processing load becomes large, depending on the communication data.

In the technology disclosed in Patent Document 1, in the case where a rule is defined for each state, all the rules defined for respective states are still referred to exhaustively; thus, the monitoring-processing load may become large, depending on the communication data. Moreover, as far as rules to be referred to in two or more states are concerned, the rules are redundantly defined. Furthermore, erroneous detection or overlooking may occur, depending on the timing for changing rules for respective states, for transmitting or receiving communication data, for performing monitoring processing, or the like.

The present disclosure has been implemented in order to solve the foregoing problems; the objective thereof is to obtain a vehicle-mounted control apparatus that can detect an abnormality in communication data, while suppressing the monitoring-processing load, and can suppress rules from being redundantly defined, by efficiently referring to rules in accordance with the communication data flowing in a network, and in which neither erroneous detection nor overlooking occurs within the preliminarily defined rules.

Solution to Problem

A vehicle-mounted control apparatus disclosed in the present disclosure includes
  a communication unit that transmits or receives communication data,
  a first storage unit that stores a rule at a time when communication data to be transmitted or received by the communication unit is normal,
  a second storage unit that stores part of rules stored in the first storage unit,
  a monitoring unit that monitors whether or not communication data to be transmitted or received by the communication unit is normal, based on rules stored in the second storage unit, and that monitors whether or not communication data to be transmitted or received by the communication unit is normal, based on rules stored in the first storage unit, when there exists no corresponding rule among rules stored in the second storage unit,
  a reference-rule recording unit that records a rule, among rules stored in the first storage unit, that coincides with under-monitoring communication data, and the number of coincidences therebetween, and a rule-updation unit that updates a rule stored in the second storage unit, based on a rule stored in the first storage unit and a record in the reference-rule recording unit.

Advantageous Effects of Invention

In a vehicle-mounted control apparatus according to present disclosure, because even when a rule related to normal-time communication data is massive, monitoring processing is performed while a rule is efficiently referred to in accordance with communication data flowing in a network, without redundantly defining a rule; thus, an abnormality in communication data can be detected while a processing load is suppressed.

BRIEF DESCRIPTION OF DRAWINGS

FIG. 2 is a table representing rules stored in a first storage unit of the vehicle-mounted control apparatus according to Embodiment 1;

FIG. 3 is a table representing rules stored in a second storage unit of the vehicle-mounted control apparatus according to Embodiment 1;

FIG. 4 is a table representing records in a reference-rule recording unit of the vehicle-mounted control apparatus according to Embodiment 1;

FIG. 8 is a table representing rules stored in a first storage unit of the vehicle-mounted control apparatus according to Embodiment 2;

FIG. 9 is a table representing rules (during normal traveling) stored in a second storage unit of the vehicle-mounted control apparatus according to Embodiment 2;

FIG. 10 is a table representing rules (during determination) stored in the second storage unit of the vehicle-mounted control apparatus according to Embodiment 2;

FIG. 11 is a table representing a monitoring result of a bus-load monitoring unit in the vehicle-mounted control apparatus according to Embodiment 2;

DESCRIPTION OF EMBODIMENTS

Figure 1:
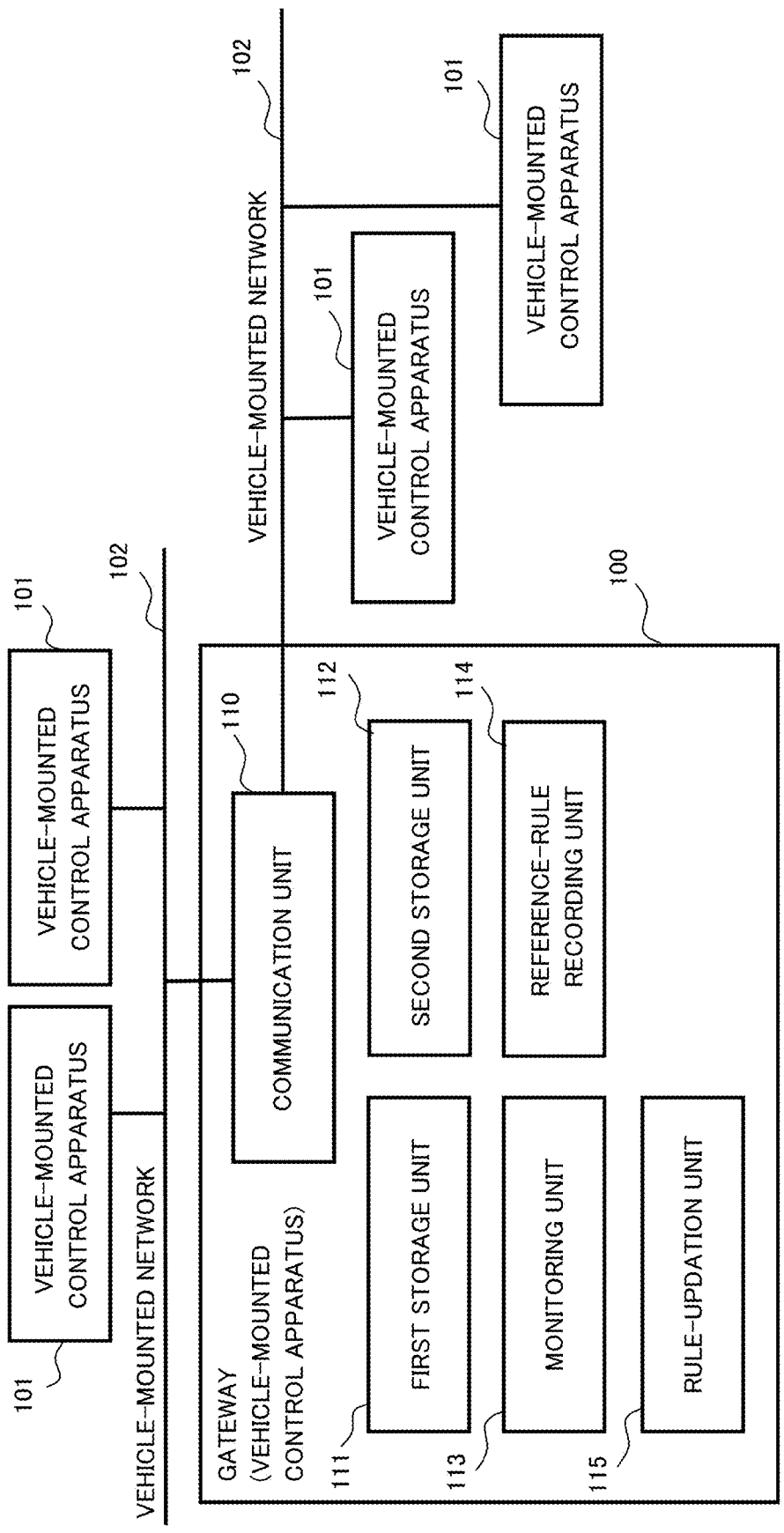
FIG. 1 is a block diagram representing the configuration of a vehicle-mounted control apparatus according to Embodiment 1.

Hereinafter, Embodiments of a vehicle-mounted control apparatus disclosed in the present disclosure will be explained by use of the drawings. In the following description, as a specific example of a vehicle-mounted control apparatus, a case will be explained in detail in which the vehicle-mounted control apparatus is connected with two or more different vehicle-mounted networks and is applied to a gateway that plays a relaying role when data is communicated among the different vehicle-mounted networks. Each of Embodiments can be applied to an intrusion detection system in the vehicle-mounted control apparatus of a vehicle to be controlled. In addition, in each of the embodiments, the same or equivalent constituent elements are designated by the respective same reference characters, and the duplicated explanations therefor will be omitted.

Embodiment 1

FIG. 1 is a diagram representing an example of the configuration of a gateway to be utilized as a vehicle-mounted control apparatus according to Embodiment 1. A gateway 100 is configured in such a way as to include a communication unit 110, a first storage unit 111, a second storage unit 112, a monitoring unit 113, a reference-rule recording unit 114, and a rule-updation unit 115. Moreover, the communication unit 110 is connected with two or more vehicle-mounted control apparatuses 101 via two or more vehicle-mounted networks 102. In addition, the configuration or the network architecture represented in FIG. 1 is just an example; thus, it is not necessarily required that the configuration or the network architecture is the same as the one represented in FIG. 1, as far as the gateway includes the communication unit 110, the first storage unit 111, the second storage unit 112, the monitoring unit 113, the reference-rule recording unit 114, and the rule-updation unit 115 and is connected with one or more vehicle-mounted control apparatuses 101 via one or more vehicle-mounted networks 102.

Hereinafter, the respective constituent elements of the gateway (vehicle-mounted control apparatus) 100 and the respective functions thereof will be explained briefly.

The communication unit 110 performs transmission and reception of communication data with each of the vehicle-mounted control apparatuses 101 via the vehicle-mounted networks 102 with which the communication unit 110 is connected. As the vehicle-mounted network 102, for example, a CAN (Control Area Network), an Ethernet (registered trademark), or the like is conceivable; however, the vehicle-mounted network 102 is not limited thereto. In addition, also as for the vehicle-mounted control apparatus, the function thereof is not limited to the function of a gateway for the communication among the vehicle-mounted control apparatuses; as the vehicle-mounted control apparatus, for example, an engine control apparatus or an EPS (Electric Power Steering) control apparatus, an ADAS (Advanced Driver Assistance System) control apparatus, or the like is conceivable; however, the vehicle-mounted control apparatus is not limited thereto.

From communication data to be transmitted or received via the communication unit 110, the first storage unit 111 stores rules related to normal-time communication data. Specifically, the first storage unit 111 is, for example, a ROM (Read Only Memory) or the like. In addition, it may be allowed that the storage area of these rules includes two or more vehicle-mounted control apparatuses 101.

The second storage unit 112 stores part of the rules stored in the first storage unit 111. The rules to be stored are updated by the rule-updation unit 115 described later. It is desirable that the access speed or the processing speed of the second storage unit 112 is higher than that of the first storage unit 111. Specifically, the second storage unit 112 is, for example, a RAM (Random Access Memory) or the like.

Based on the rules stored in the second storage unit 112, the monitoring unit 113 monitors whether or not communication data to be transmitted or received by the communication unit 110 is normal. In addition when no rule stored in the second storage unit 112 coincides with the communication data, the monitoring unit 113 monitors whether or not the communication data is normal, based on the rules stored in the first storage unit 111. When none of the rules stored in the second storage unit 112 and the first storage unit 111 coincides with the communication data, the monitoring unit 113 detects the under-monitoring communication data as an abnormality. The result of monitoring the communication data may be notified to another function mounted in the gateway 100 or may be notified to the vehicle-mounted control apparatus 101 from the communication unit 110 via the vehicle-mounted network 102. In addition, in FIG. 1, the representation of the other functions mounted in the gateway 100 is omitted.

The reference-rule recording unit 114 records the number of coincidences of the communication data and each of the rules stored in the first storage unit 111. When the result of the monitoring processing by the monitoring unit 113 is normal, the number of coincidences is incremented with regard to the rule that has coincided with the under-monitoring communication data.

The rule-updation unit 115 updates the rules stored in the second storage unit 112, based on the record in the reference-rule recording unit 114. In this situation, the updation of the rules includes addition of the rules stored in the first storage unit 111 to the second storage unit 112, deletion of the rules stored in the second storage unit 112, rearrangement of the order of the rules stored in the second storage unit 112, and the like.

The respective configurations of the rules to be stored in the first storage unit 111 and the second storage unit 112 according to Embodiment 1 will be explained by use of FIGS. 2 and 3.

As represented in FIGS. 2 and 3, items for determining whether or not communication data flowing in the network is normal are described in each of the rules to be stored in the first storage unit 111 and the second storage unit 112. Each of the rules to be stored in the first storage unit 111 and the second storage unit 112 includes a rule number, a data ID, a transmission source, a transmission destination, a data size, a data piece, and the like. These items are arbitrary; another item may be adopted, as far as it can uniquely specify the rule and it makes it possible to determine whether or not the communication data is normal.

As represented in FIG. 2, 5 rules are stored in the first storage unit 111. As represented in FIG. 3, part (3) of the rules to be stored in the first storage unit 111 are stored in the second storage unit 112, and the storing order thereof is arbitrary; the storing order may be the same as or different from that of the first storage unit 111.

The records in the reference-rule recording unit 114 according to Embodiment 1 will be explained by use of FIG. 4.

As represented in FIG. 4, the reference-rule recording unit 114 records the number of coincidences of each of the rules stored in the first storage unit 111 that has coincided with the under-monitoring communication data in the monitoring processing. In FIG. 4, as the items, the rule number and the number of coincidences are stored; however, any item may be adopted, as far as it makes it possible to uniquely specify the rule stored in the first storage unit 111 and it can tell the number of coincidences of each of the rules that has coincided with the under-monitoring communication data in the monitoring processing.

Next, a series of flows in the monitoring processing by the gateway 100 according to Embodiment 1 will be explained by use of FIG. 5, and a series of flows in the rule-updation processing will be explained by use of FIG. 6. In addition, because the monitoring processing and the rule-updation processing are performed independently from each other, each of them is performed at an arbitrary timing.

Figure 5:
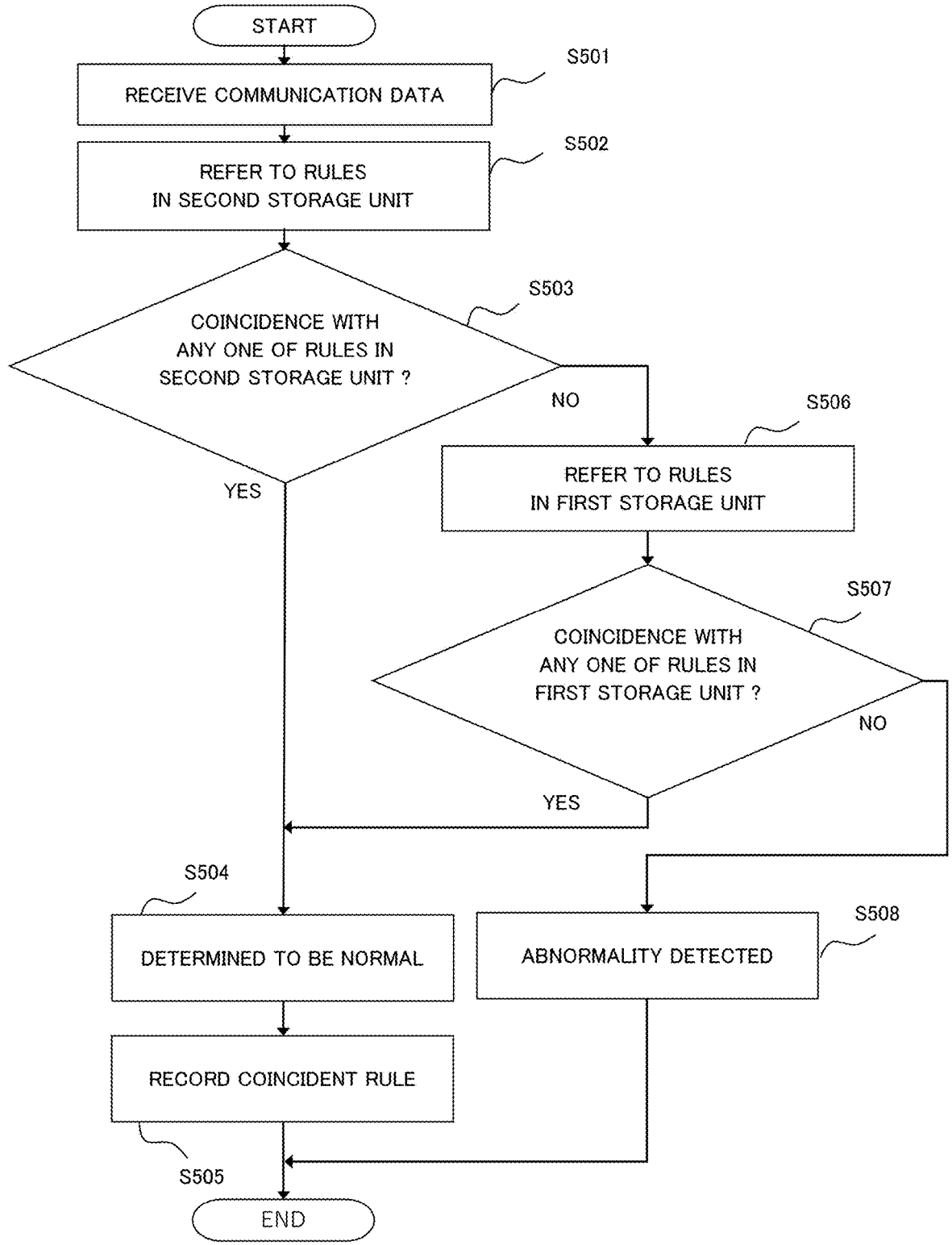
FIG. 5 is a flowchart representing a flow of monitoring processing in the vehicle-mounted control apparatus according to Embodiment 1.

In FIG. 5, in the step S501, the communication unit 110 transmits or receives communication data from the vehicle-mounted control apparatus 101 via the vehicle-mounted network 102. In FIG. 5, the monitoring processing is performed each time the communication data is transmitted or received; however, it may be allowed that the communication data pieces are accumulated by use of a queue or the like and then the monitoring processing is performed collectively at a specific timing.

In the steps S502 and S503, based on the rules stored in the second storage unit 112, the monitoring unit 113 determines whether or not communication data to be transmitted or received in the step S501 is normal. The monitoring unit 113 sequentially compares the communication data to be transmitted or received with each of the rules stored in the second storage unit 112 and determines whether or not the communication data coincides with any one of the rules. In the case where there exists a rule that coincides with the communication data, the step S503 is immediately followed by the step S504; in the case where the communication data coincides with none of the stored rules, the step S503 is followed by the step S506.

In the steps S506 and S507, based on the rules stored in the first storage unit 111, the monitoring unit 113 determines whether or not the communication data to be transmitted or received in the step S501 is normal. The monitoring unit 111 sequentially compares the communication data to be transmitted or received with each of the rules stored in the first storage unit 111 and determines whether or not the communication data coincides with any one of the rules. In the case where there exists a rule that coincides with the communication data, the step S507 is immediately followed by the step S504; in the case where the communication data coincides with none of the stored rules, the step S507 is followed by the step S508.

In addition, it is desirable that when in the steps S506 and S507, the communication data to be transmitted or received is compared with each of the rules stored in the first storage unit 111, the communication data is not compared with the rule that has already been compared therewith in the steps S502 and S503.

In the step S504, the monitoring unit 113 understands that the communication data to be transmitted or received has coincided with any one of the rules stored in the second storage unit 112 and the first storage unit 111 and then determines that the under-monitoring communication data is normal. The result of determination of normality may be notified to another function mounted in the gateway 100 or may be notified to the vehicle-mounted control apparatus 101 from the communication unit 110 via the vehicle-mounted network 102.

In the step S505, with regard to the rule that has coincided with the communication data in the steps S502 and S503 or in the steps S506 and S507, the number of coincidences thereof in the records of the reference-rule recording unit 114 is incremented by 1.

In the step S508, the monitoring unit 113 understands that the communication data to be transmitted or received has coincided with none of the rules stored in the second storage unit 112 and the first storage unit 111 and then determines that the under-monitoring communication data is abnormal. The result of determination of abnormality may be notified to another function mounted in the gateway 100 or may be notified to the vehicle-mounted control apparatus 101 from the communication unit 110 via the vehicle-mounted network 102.

Subsequently, in FIG. 6, the records in the reference-rule recording unit 114 are obtained in the step S601.

In the step S602, the rules stored in the second storage unit 112 are updated based on the reference-rule records obtained in the step S601. In the examples in FIGS. 2, 3, and 4, the rules, each of whose numbers of coincidences is larger than 1, are rearranged in descending order of the number of coincidences and then are stored in the second storage unit 112.

Figure 6:
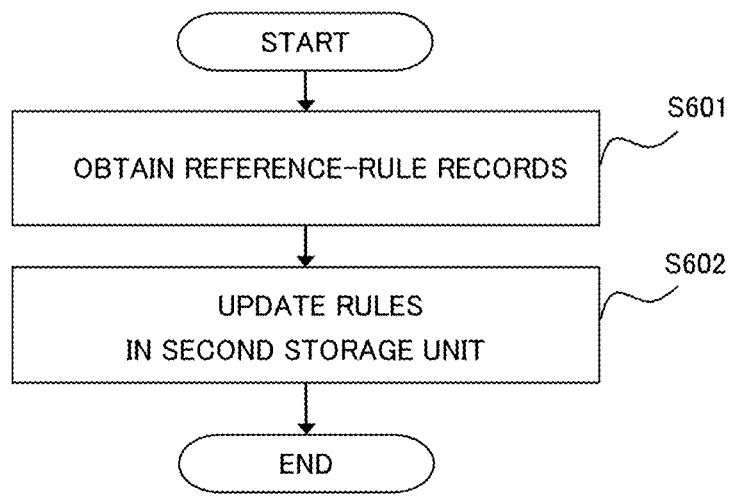
FIG. 6 is a flowchart representing a flow of rule-updation processing in the vehicle-mounted control apparatus according to Embodiment 1.

In FIG. 6, the rule-updation processing may be dynamically performed in combination with the monitoring processing or may be statically performed at the same time when the ignition is turned off, when the vehicle is diagnosed, when the software is updated in an OTA (Over The Air) manner, or the like.

As described above, in the vehicle-mounted control apparatus according to Embodiment 1, because in the monitoring processing, the rule with higher coincidence is preferentially referred to, it is made possible that the data flowing in the network is monitored while the rules are efficiently referred to; thus, the monitoring-processing load can be suppressed.

Moreover, because only the rule stored in the second storage unit overlaps the rule stored in the first storage unit, the overlapping degree of the rule is 2 at largest; thus, redundant definition of the rule can be suppressed.

Furthermore, because in the monitoring processing, all the preliminarily defined rules are utilized, neither erroneous detection nor overlooking occurs within the range of the preliminarily defined rules.

Embodiment 2

Next, the vehicle-mounted control apparatus according to Embodiment 2 will be explained by use of FIGS. 7 through 13.

Figure 7:
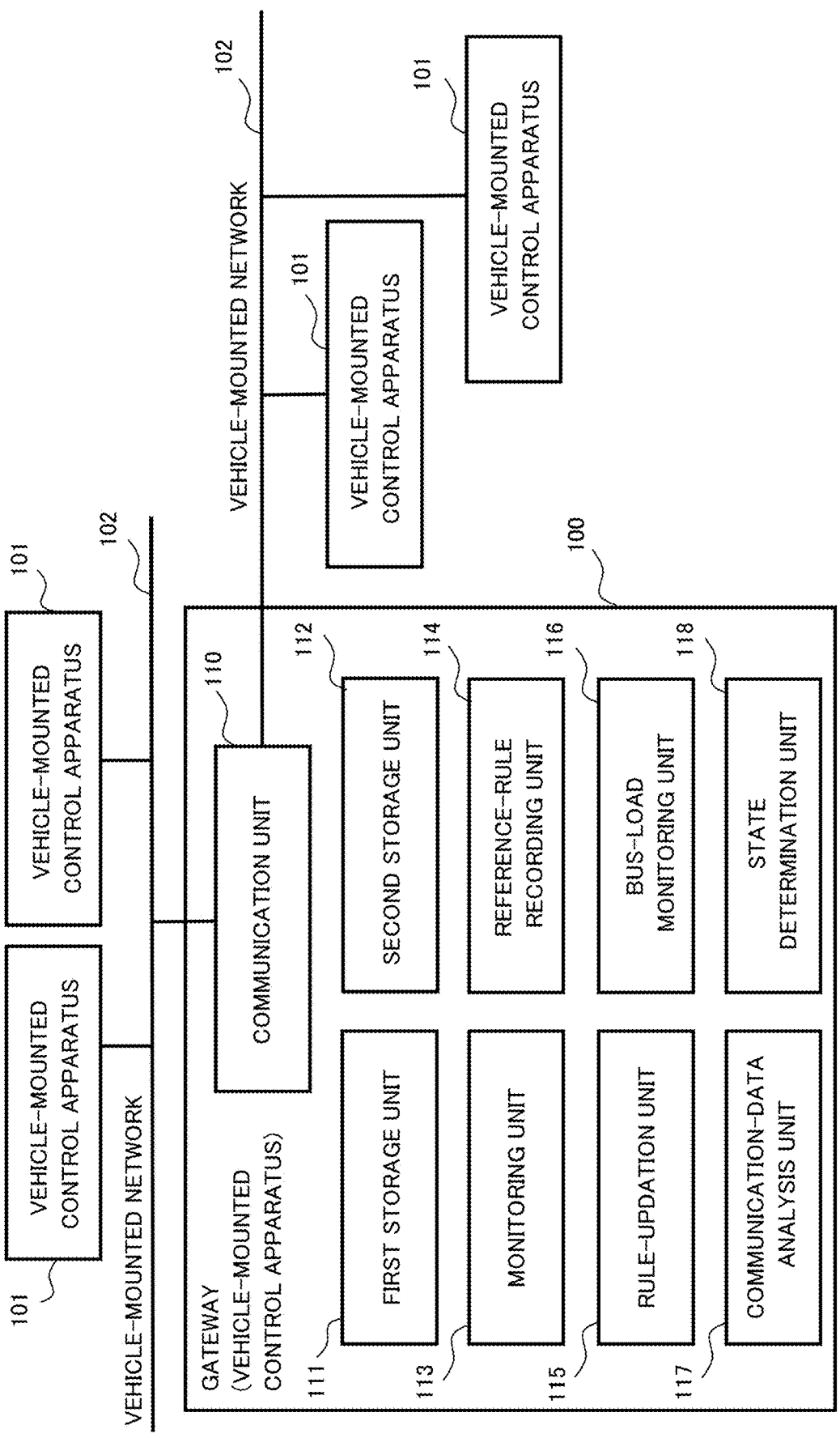
FIG. 7 is a block diagram representing the configuration of a vehicle-mounted control apparatus according to Embodiment 2.

FIG. 7 is a diagram representing an example of the configuration of a gateway according to Embodiment 2. The gateway 100 in FIG. 2 is different from the gateway 100 in FIG. 1 in that it includes a bus-load monitoring unit 116, a communication-data analysis unit 117, and a state determination unit 118. In addition, the configuration represented in FIG. 7 is just an example; thus, the configuration is not limited to that in FIG. 7.

Hereinafter, with regard to the constituent elements and the respective functions thereof of the gateway 100, the points different from those in Embodiment 1 will briefly be explained.

The rule-updation unit 115 updates the rules stored in the second storage unit 112, based on the respective importances, of the communication data, to the rules stored in the first storage unit 111, the records in the reference-rule recording unit 114, the monitoring results of the bus-load monitoring unit 116, the analysis results of the communication-data analysis unit 117, and the determination results of the state determination unit 118.

The bus-load monitoring unit 116 monitors the respective load states of the buses, with regard to all the vehicle-mounted networks 102 connected with the communication unit 110, and then notifies the rule-updation unit 115 of the monitoring results.

In the case where the monitoring unit 113 performs the monitoring processing and detects an abnormality, the communication-data analysis unit 117 analyses the under-monitoring communication data and then notifies the rule-updation unit 115 of the analysis results. The analysis of the communication data identifies an item, such as a data ID, a transmission source, a transmission destination, a data size, or data, that has caused an abnormality. These items are arbitrary ones; however, because the rule-updation unit 115 updates the rules, based on the items that have caused abnormalities, it is desirable that the foregoing items are the same as those of the rule stored in the first storage unit 111.

The state determination unit 118 determines the current state of a vehicle and then notifies the rule-updation unit 115 of the determination result. As the states of a vehicle, for example, the state of normal traveling, the state of high-speed traveling, the state of autonomous driving, the state of degenerated driving, the state of being diagnosed, the state of updating the software, the power-saving mode, and the like are conceivable; however, the state with which the communication data flowing in the network largely changes is desirable.

The respective configurations of the rules to be stored in the first storage unit 111 and the second storage unit 112 according to Embodiment 2 will be explained by use of FIGS. 8, 9, and 10.

As represented in FIGS. 8, 9, and 10, items for determining whether or not communication data flowing in the network is normal and items that are referred to by the rule-updation unit 115 at a time when the rule stored in the second storage unit 112 is updated are described in each of the rules to be stored in the first storage unit 111 and the second storage unit 112. Each of the rules to be stored in the first storage unit 111 and the second storage unit 112 includes a rule number, a data ID, a transmission source, a transmission destination, a data size, a data piece, a bus number, a vehicle state, a communication-data importance, and the like. These items are arbitrary; another item may be adopted, as far as it can uniquely specify the rule, can determine whether or not the communication data is normal, can determine which bus the communication bus is flowing in which vehicle state, and can determine the respective importances, of the communication data, to the rules.

FIG. 8 represents the rules stored in the first storage unit 111; FIG. 9 represents the rules stored in the second storage unit 112 (during normal traveling); FIG. 10 represents the rules stored in the second storage unit 112 (during diagnosis).

In this situation, the communication-data importance means, for example, the degree of influence on the vehicle at a time when an abnormality occurs in the communication data; specifically, for example, in the case of communication data related to vehicle traveling control, the degree of influence is set to be high, because when an abnormality occurs, an important accident may be caused at high probability. In contrast, for example, in the case of communication data related to an infotainment system, the degree of influence is set to be low, because even when an abnormality occurs, an important accident is not liable to occur. In addition, the communication-data importance means, for example, the degree of influence on the vehicle or a user at a time when the information of the communication data leaks out; specifically, for example, in the case of communication data related to the information of a privilege account, a key to be utilized for r cryptographic communication, or the privacy of the user, the degree of influence is set to be high, because when the information leaks out, it is utilized for a wrong purpose and hence an important incident may be caused at high probability. In contrast, for example, in the case of communication data related to periodical communication in alive monitoring, turning on/off of a switch, or a sensor value, the degree of influence is set to be low, because even when the information leaks out, an important incident is not liable to occur. In addition, each of these indexes is just an example; another index may be adopted, as far as it makes it possible that a beneficial effect can be obtained by preferentially monitoring communication data with high importance degree.

The result of bus monitoring by the bus-load monitoring unit 116 according to Embodiment 2 will be explained by use of FIG. 11.

As represented in FIG. 11, the monitoring result to be notified from the bus-load monitoring unit 116 to the rule-updation unit 115 includes the respective load situations of all the buses to be connected with the communication unit 110. The monitoring result to be notified by the bus-load monitoring unit 116 includes a bus number, a load, and the like. These items are arbitrary; another item may be adopted, as far as it can uniquely specify a bus and can indicate the load situation of the bus.

Next, a series of flows in the monitoring processing by the gateway 100 according to Embodiment 2 will be explained by use of FIG. 12, and a series of flows in the rule-updation processing will be explained by use of FIG. 13. Only the items different from those in Embodiment 1 will be explained, and the explanations for the items that are the same as those in Embodiment 1 will be omitted. In addition, because the monitoring processing and the rule-updation processing are performed independently from each other, each of them is performed at an arbitrary timing.

Figure 12:
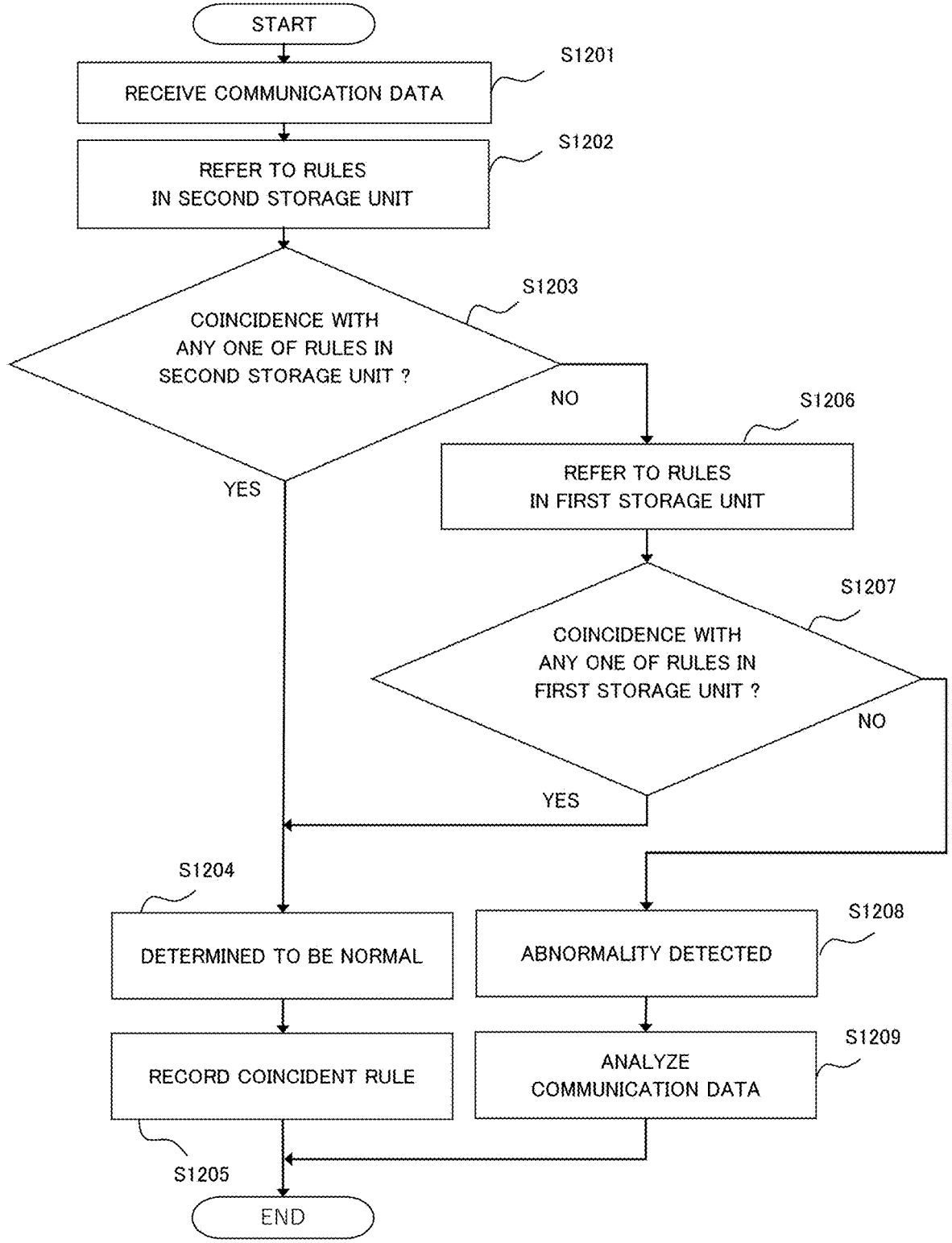
FIG. 12 is a flowchart representing a flow of monitoring processing in the vehicle-mounted control apparatus according to Embodiment 2.

In FIG. 12, the processing contents of the steps S1201 through S1208 are the same as those of the steps S501 through S508 in FIG. 5. In the step S1209 in FIG. 12, the communication-data analysis unit 117 analyses the communication data that has been detected to be abnormal by the monitoring unit 113 and then identifies the item in the rule that has caused the abnormality. The result of the analysis is notified to the rule-updation unit 115 in the rule-updation processing described later.

Subsequently, in FIG. 13, the processing the same as that in the step S601 in FIG. 6 is performed in the step S1301; in the step S1302, the bus-load monitoring unit 116 monitors the respective load situations of all the buses connected with the communication unit 110. The result of the monitoring is notified to the rule-updation unit 115.

In the step S1303, the rule-updation unit 115 obtains the result of the analysis performed by the communication-data analysis unit 117 in the step S1209 in FIG. 12 which is the monitoring processing.

In the step S1304, the state determination unit 118 determines the current state of the vehicle and then notifies the rule-updation unit 115 of the determination result.

In the step S1305, the rule-updation unit 115 updates the rules stored in the second storage unit 112, based on the records in the reference-rule recording unit 114, the monitoring results of the bus-load monitoring unit 116, the analysis results of the communication-data analysis unit 117, the determination results of the state determination unit 118, and the importance of the communication data.

As the logic for updating the rules, for example, based on the result of the determination by the state determination unit 118, only the rules that coincide with the current vehicle state are stored in the second storage unit 112. Moreover, the bus with a high load has a high possibility that communication data other than the presumable communication data, i.e., an incorrect communication data is flowing therein; therefore, based on the result of the monitoring by the bus-load monitoring unit 116, the rules of the communication data flowing in the bus with a high load are preferentially updated. With regard to the rule of the communication data flowing in two or more buses, the bus that has the highest load among those is adopted as a reference. Moreover, based on the importance of the communication data, the rules are rearranged in descendent order of the importance. Furthermore, based on the result of the analysis by the communication-data analysis unit 117, the rule that has a value the same as that in the item causing an abnormality is preferentially updated. For example, because in the case where a transmission source is the cause of an abnormality in the communication data, the possibility that the transmission source is abnormal is high, it is conceivable that the possibility that the communication data to be transmitted subsequently from the transmission source is abnormal is high. Accordingly, the rule having a transmission source similar to the foregoing transmission source is preferentially updated.

In FIGS. 8 through 11, only the rules that coincide with the current vehicle state are stored in the second storage unit 112; the rules are rearranged in descendent order of bus's load; furthermore, for each bus, the rules are rearranged in descendent order of the importance of the communication data. In addition, the rule-updation logic for each reference or the importance among two or more references in FIGS. 8 through 11 is just an example; thus, the logic or the importance is not limited thereto.

Figure 13:
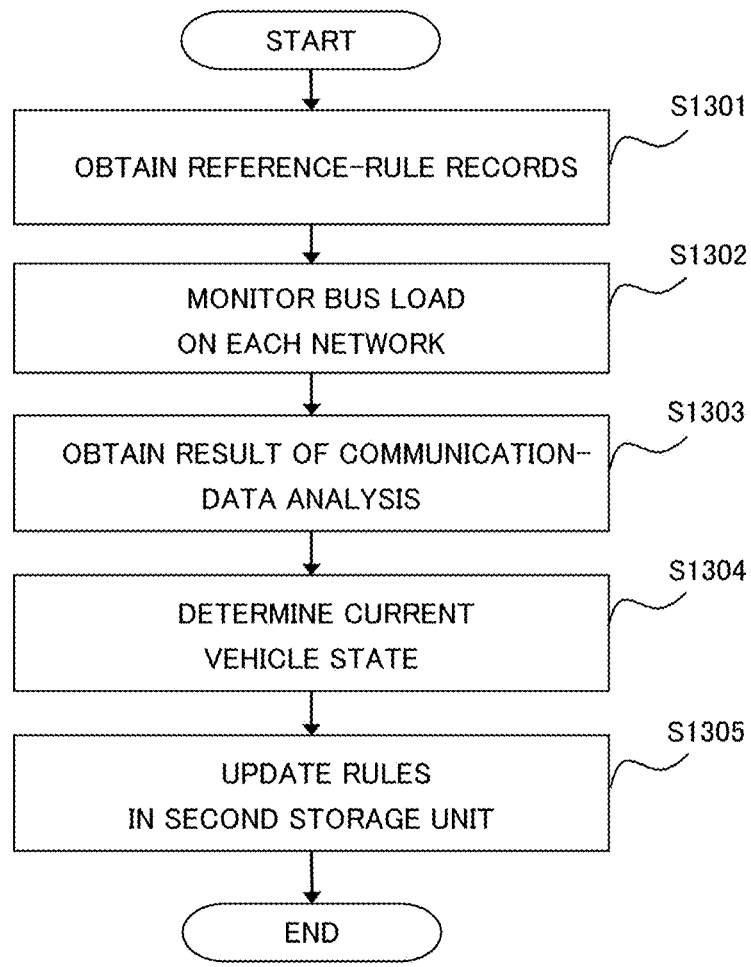
FIG. 13 is a flowchart representing a flow of rule-updation processing in the vehicle-mounted control apparatus according to Embodiment 2.

In addition, the series of flows in the rule-updation processing in FIG. 13 is just an example; thus, the rules may be updated based on all the references or based on part of the references. In addition, in the case where the rules are updated based on part of the references, it may be allowed that the steps corresponding to notification and obtainment of the references that are not referred to are omitted.

The step S1305 is different from the step S602 in FIG. 6 in that the rules stored in the second storage unit 112 are updated based on two or more references such as not only the records in the reference-rule recording unit 114 but also the monitoring results of the bus-load monitoring unit 116, the analysis results of the communication-data analysis unit 117, the determination results of the state determination unit 118, and the importance of the communication data.

As described above, the vehicle-mounted control apparatus according to Embodiment 2 makes it possible that in accordance with the current state of a vehicle, the communication data corresponding to the vehicle state is preferentially monitored and hence the monitoring-processing load is suppressed.

Moreover, it is made possible that in accordance with the load situations of the buses, the communication data flowing in a high-load bus is preferentially monitored, and it is made possible that in accordance with the cause of an abnormality in the communication data that has been detected to be abnormal, the communication data having an element similar to the cause of the abnormality is preferentially monitored; thus the abnormality can rapidly be detected.

Furthermore, it is made possible that in accordance with the importance of communication data, the high-importance communication data is preferentially monitored; thus, the influence on a vehicle at a time when an abnormality occurs or the influence on a vehicle or a user at a time when information leaks out can be reduced.

Figure 14:
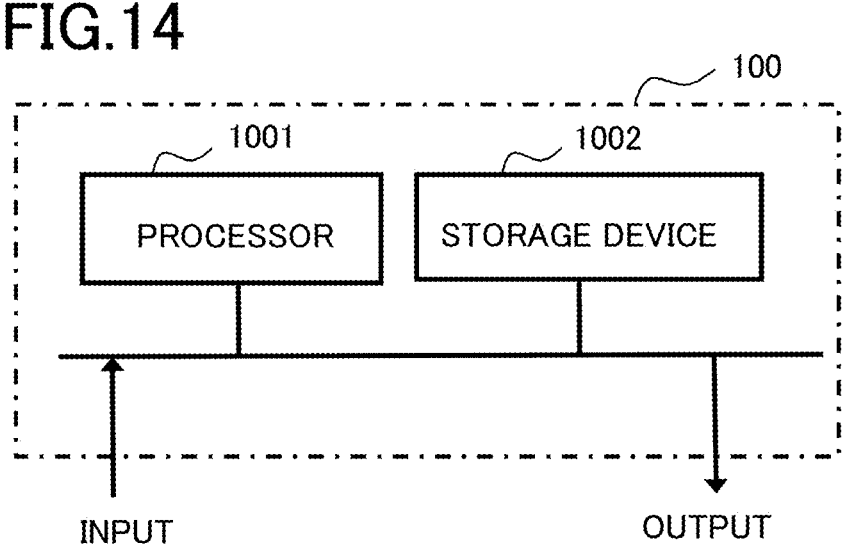
FIG. 14 is a diagram representing an example of the hardware configuration of the vehicle-mounted control apparatus according to each of foregoing Embodiments.

As FIG. 14 represents an example of the hardware, the gateway (vehicle-mounted control apparatus) 100 includes a processor 1001 and a storage apparatus 1002. The storage apparatus 1002 has, for example, a volatile storage device such as a random access memory and a nonvolatile auxiliary storage device such as a flash memory. In addition, instead of the flash memory, a hard disk may be included as the auxiliary storage device. The processor 1001 executes a program inputted from the storage apparatus 1002. In this case, the program is inputted from the auxiliary storage device to the processor 1001 by way of the volatile storage device. Moreover, the processor 1001 may output data such as a calculation result either to the volatile storage device of the storage device 1002 or to the auxiliary storage device by way of the volatile storage device.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the specification of the present disclosure. For example, at least one of the constituent components may be modified, added, or eliminated; moreover, at least one of the constituent components mentioned in at least one of the preferred embodiments may be selected and combined with the constituent components mentioned in another preferred embodiment.

DESCRIPTION OF REFERENCE NUMERALS

100: gateway (vehicle-mounted control apparatus)
101: vehicle-mounted control apparatus
102: vehicle-mounted network
110: communication unit
111: first storage apparatus
112: second storage unit
113: monitoring unit
114: reference-rule recording unit
115: rule-updation unit
116: bus-load monitoring unit
117: communication-data analysis unit
118: state determination unit

The invention claimed is:

1. A vehicle-mounted control apparatus that performs data communication with two or more control apparatuses, the vehicle-mounted control apparatus comprising:
   a communicator that transmits or receives communication data;
   a first storage that stores a rule at a time when communication data to be transmitted or received by the communicator is normal;
   a second storage that stores part of rules stored in the first storage;
   a monitor that monitors whether or not communication data to be transmitted or received by the communicator is normal, based on rules stored in the second storage, and that monitors whether or not communication data to be transmitted or received by the communicator is normal, based on rules stored in the first storage, when there exists no corresponding rule among rules stored in the second storage;
   a reference-rule recorder that records a rule, among rules stored in the first storage, that coincides with under-monitoring communication data, and the number of coincidences therebetween; and
   a rule-updater that updates a rule stored in the second storage, based on a rule stored in the first storage and a record in the reference-rule recorder,
   wherein a rule stored in the first storage includes, as an item, information on a bus in which communication data that is a monitoring object of a rule flows,
   wherein there is provided a bus-load monitor that monitors respective load situations of all buses to be connected with the communicator, and
   wherein the rule-updater updates rules stored in the second storage, based on a result of monitoring by the bus-load monitor.

2. The vehicle-mounted control apparatus according to claim 1, wherein a rule stored in the first storage includes, as an item, an importance of communication data that is a monitoring object of a rule, and the rule-updater updates a rule stored in the second storage, based on the importance of the communication data.

3. The vehicle-mounted control apparatus according to claim 2, further comprising a communication-data analyzer that identifies a cause of an abnormality in communication data that has been monitored and detected to be abnormal by the monitor, wherein the rule-updater updates rules stored in the second storage, based on a result of analysis by the communication-data analyzer.

4. The vehicle-mounted control apparatus according to claim 3,
   wherein a rule stored in the first storage includes, as an item, a vehicle state at a time when communication data that is a monitoring object of a rule is transmitted or received,
   wherein there is provided a state determinator that determines a current vehicle state, and
   wherein the rule-updater updates rules stored in the second storage, based on a result of determination by the state determinator.

5. The vehicle-mounted control apparatus according to claim 2,
   wherein a rule stored in the first storage includes, as an item, a vehicle state at a time when communication data that is a monitoring object of a rule is transmitted or received,
   wherein there is provided a state determinator that determines a current vehicle state, and
   wherein the rule-updater updates rules stored in the second storage, based on a result of determination by the state determinator.

6. The vehicle-mounted control apparatus according to claim 1, further comprising a communication-data analyzer that identifies a cause of an abnormality in communication data that has been monitored and detected to be abnormal by the monitor, wherein the rule-updater updates rules stored in the second storage, based on a result of analysis by the communication-data analyzer.

7. The vehicle-mounted control apparatus according to claim 6,
   wherein a rule stored in the first storage includes, as an item, a vehicle state at a time when communication data that is a monitoring object of a rule is transmitted or received,
   wherein there is provided a state determinator that determines a current vehicle state, and wherein the rule-updater updates rules stored in the second storage, based on a result of determination by the state determinator.

8. The vehicle-mounted control apparatus according to claim 1,
wherein a rule stored in the first storage includes, as an item, a vehicle state at a time when communication data that is a monitoring object of a rule is transmitted or received,
wherein there is provided a state determinator that determines a current vehicle state, and
wherein the rule-updater updates rules stored in the second storage, based on a result of determination by the state determinator.

\* \* \* \* \*